Figure 2B:
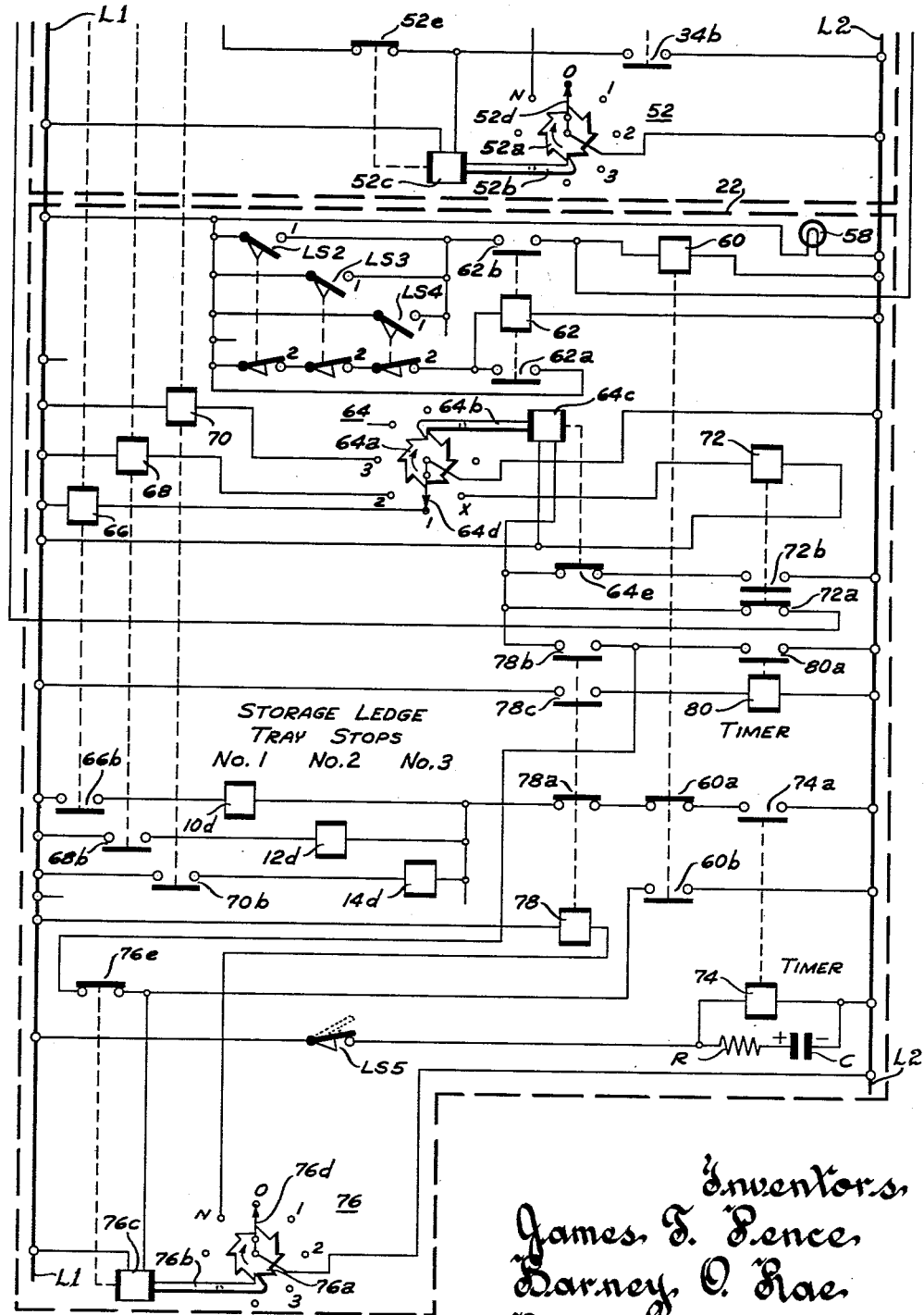

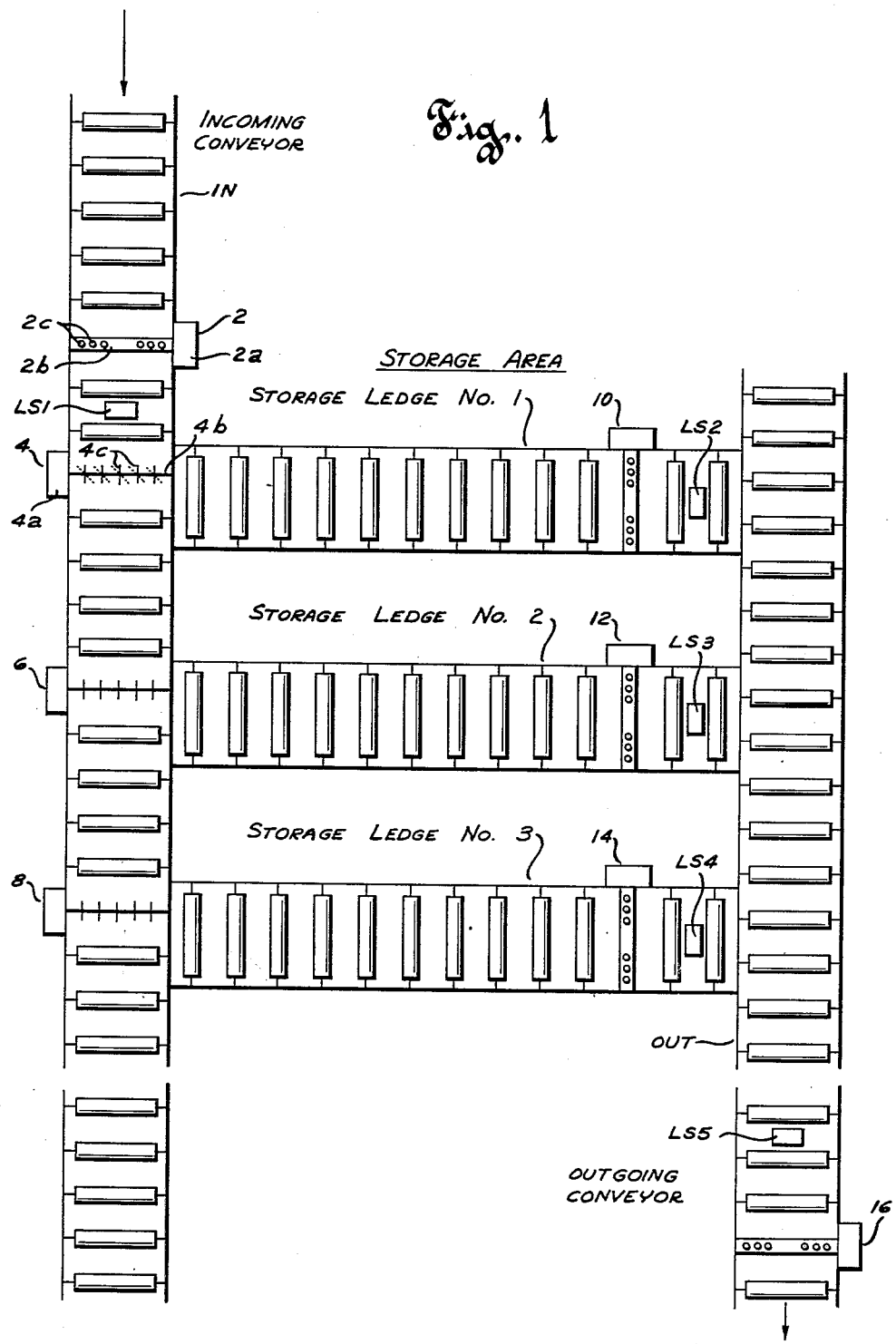

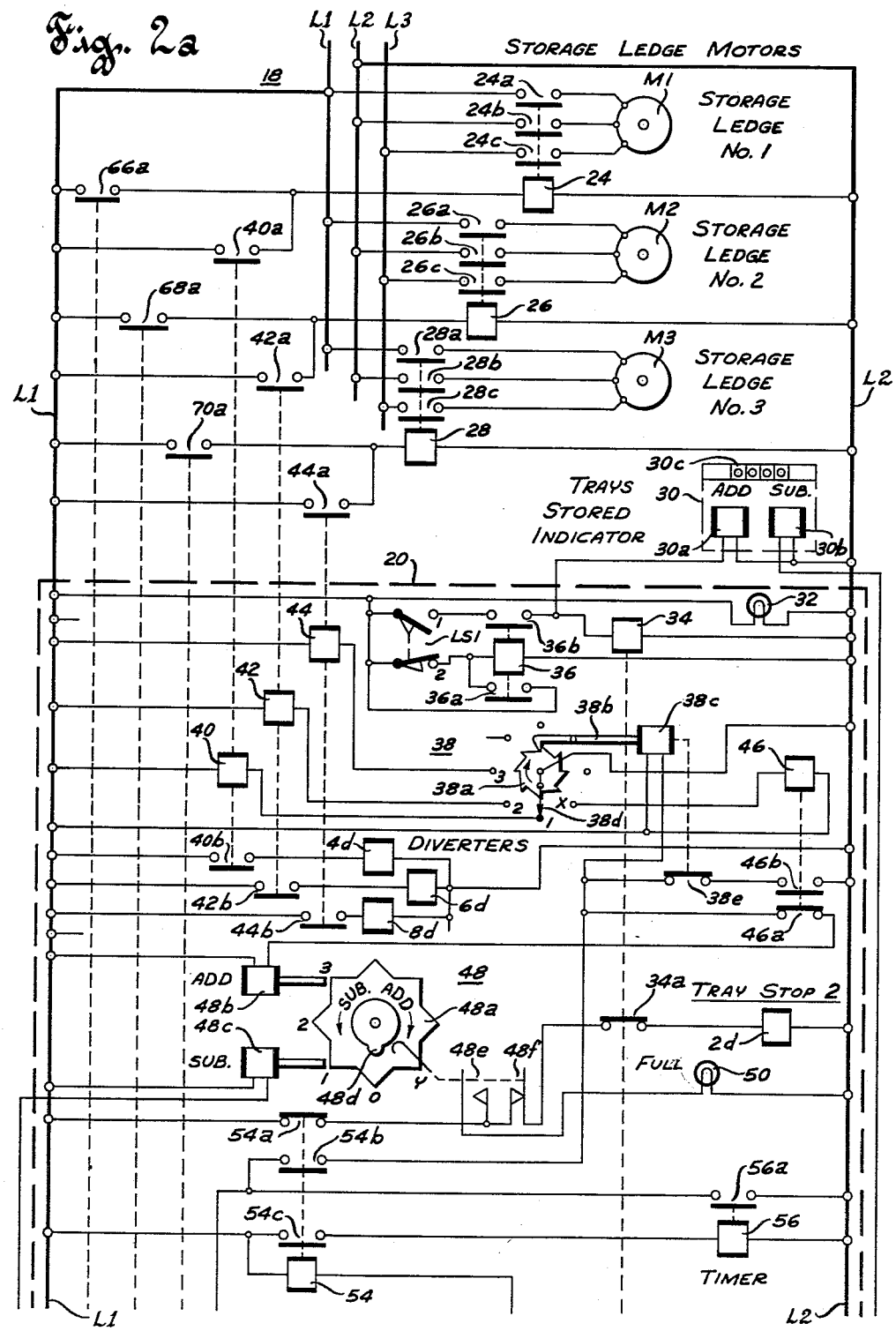

3,122,231
MEMORY TYPE STORAGE CONVEYOR SYSTEM
James T. Pence and Barney O. Rae, Milwaukee, Wis., assignors to Cutler-Hammer, Inc., Milwaukee, Wis., a corporation of Delaware
Filed June 21, 1960, Ser. No. 37,797
20 Claims. (Cl. 198—78)

This invention relates to conveyor systems and more particularly to systems for automatically controlling storage of articles such as trays and the like on storage conveyors and for automatically controlling withdrawal of articles from the storage conveyors and addition of articles thereto in a first-in first-out order.

While not limited thereto, the invention is especially applicable to post office conveyor systems for controlling the storage of mail or letter trays awaiting conveyance thereof to sorting stations.

An object of the invention is to provide an improved conveyor system.

Another object of the invention is to provide improved control systems for controlling admission of articles such as trays to side ledge storage conveyors and for controlling withdrawal of the same therefrom in a predetermined order.

Another object of the invention is to incorporate in such control systems improved memory means for registering storage information whereby, in the event the conveyors are stopped or power fails, the pre-existing state of admission and withdrawal of articles will be resumed when reoperation or power is reestablished.

Another object of the invention is to provide an improved control system for controlling admission of articles to one or more side ledge storage conveyors and for controlling withdrawal of the same therefrom in a first-in first-out order.

A related object of the invention is to provide in such control system improved means for stopping the admission of articles to the side ledge storage conveyors when the latter are full.

Another related object of the invention is to provide in such control system improved means for controlling withdrawal of articles from the side ledge storage conveyors until a predetermined number of articles are available for delivery and thereupon to stop such withdrawal thereby to maintain such predetermined number of articles available for delivery at all times.

A further object of the invention is to incorporate in such system means for indicating the number of articles in storage and for indicating whether or not the storage system is full.

In accordance with the invention, there is provided an incoming conveyor, a plurality of side ledge storage conveyors having access from the incoming conveyor and an outgoing conveyor accessible to the storage conveyors. The incoming conveyor is provided with a controllable stop for admitting trays toward the storage conveyors and a plurality of controllable diverting mechanisms for turning trays onto the respective storage conveyors. Each storage conveyor is provided with a controllable stop for releasing trays therefrom onto the outgoing conveyor. An automatic control system is provided for controlling admission and withdrawal of groups of trays from the storage conveyors, the number of trays in each such group corresponding to the number thereof that can be stored on each storage conveyor. The functional elements of the control system comprise stepping devices for registering information pertaining to each step of the filling and emptying operations so that, in the event the system is stopped or power fails, the interrupted operation is resumed without losing track of the trays which were enroute. In conjunction with such control system there is provided a counter affording a continuous numerical indication of the total number of trays in storage and a visual indicator for indicating when the storage area is full.

The above mentioned and other objects and advantages of the invention and the manner of obtaining them will best be understood by reference to the following detailed description of an exemplary embodiment of a conveyor system and control therefor taken in conjunction with the accompanying drawings wherein:

FIGURE 1 is a schematic illustration of a conveyor system layout showing an incoming conveyor, a plurality of storage ledge conveyors and an outgoing conveyor and control devices therefor; and FIGS. 2a and 2b when connected to one another diagrammatically show a control circuit for the conveyor system of FIG. 1.

Referring to FIG. 1, there is shown a conveyor system having an incoming conveyor IN, a plurality of storage ledge conveyors Nos. 1, 2 and 3 arranged transversely of the incoming conveyor and spaced therealong and an outgoing conveyor OUT. The entry ends of the storage ledge conveyors are immediately adjacent to one side of the incoming conveyor and the exit ends of the storage ledge conveyors are immediately adjacent to one side of the outgoing conveyor whereby trays coming along the incoming conveyor can enter each storage ledge conveyor at the entry end thereof and pass therethrough and emerge at the exit end thereof onto the outgoing conveyor. Each conveyor is provided with a pair of support or frame members between which a plurality of conveyor rollers are rotatably supported. The conveyor rollers are adapted to be frictionally driven by endless motor driven belts, not shown, which belts travel beneath the rollers so that the rollers support and convey the trays thereover.

As the trays traveling along the incoming conveyor approach the storage area, provision must be made for spacing the trays from one another so that they do not interfere with one another and jam when each tray is diverted from the incoming conveyor onto a storage ledge conveyor. For this purpose an intermittently operable tray stop 2 is provided at an intermediate point on the incoming conveyor to momentarily stop each tray and thereby space the same from its immediately leading tray. This spacing between trays is determined by the location of a limit switch LS1 mounted on the incoming conveyor a predetermined distance beyond tray stop 2, this limit switch LS1 being operable to control the tray stop to release each succeeding tray as soon as the preceding tray has passed over the limit switch. Tray stop 2 is provided with an electrically operable mechanism 2a mounted on a side rail of the incoming conveyor, a rotatary shaft 2b extending from operating mechanism 2a transversely across the incoming conveyor and a plurality of pins 2c secured to and extending from shaft 2b for blocking the passage of trays along the incoming conveyor, shaft 2b being rotatable to release a tray each time operating mechanism 2a is energized. For a more detailed description of tray stop 2, reference may be had to William D. Brand, Richard J. Byrnes and Harold S. Montgomery copending application Ser. No. 14,906, filed March 14, 1960 and assigned to the assignee of the present invention.

A plurality of diverter mechanisms 4, 6 and 8, one for each storage ledge conveyor, are mounted in spaced relation along incoming conveyor IN. Each such diverter mechanism 4, 6 and 8 is arranged across the incoming conveyor immediately adjacent the entry side of the storage ledge conveyor. Diverter mechanism 4 comprises an electrical operating mechanism 4a mounted at one side of incoming conveyor IN onto a side rail thereof, a supporting structure 4b arranged transversely across the incoming conveyor and a plurality of diverting wheels 4c of the skate wheel type or the like mounted on supporting structure 4b to be freely rotatable, these diverting wheels being operable from the straight ahead position shown in solid lines to a diverting position substantially 45 degrees toward the associated storage ledge conveyor, as shown in dotted lines in FIG. 1, in response to energization of operating mechanisms 4a. Diverting mechanism 4 is constructed so that diverting wheels 4c will be returned to their normal straight ahead position by spring means or the like when operating mechanism 4a is deenergized. Diverting mechanisms 6 and 8 are similar to diverting mechanism 4. For a more detailed description of a diverting mechanism of the skate wheel type, reference may be had to Richard J. Byrnes, Robert N. Eck, Clyde F. Robbins and Norbert Sadowski copending application Ser. No. 37,611, filed June 21, 1960 and assigned to the assignee of the present invention.

A plurality of tray stops 10, 12 and 14 one for each storage ledge conveyor, are mounted on storage ledge conveyors Nos. 1, 2 and 3 near the exit ends thereof, these tray stops being similar to tray stop 2. These tray stops hold the trays on the respective storage ledge conveyors and are selectively operated, as hereinafter to be described in connection with FIGS. 2a and 2b, to release selected numbers of trays for delivery by the outgoing conveyor. A plurality of limit switches LS2, LS3 and LS4, one for each storage ledge conveyor, are mounted on storage ledge conveyors Nos. 1, 2 and 3 immediately adjacent the exit ends thereof between each associated tray stop and outgoing conveyor OUT. These limit switches count the trays as they are released from each storage ledge conveyor and, when all the trays from a given storage ledge conveyor have been delivered, switch the delivery to the next storage ledge conveyor. Outgoing conveyor OUT is provided at a point beyond the storage area with a tray stop 16 for stopping an accumulation of trays which have been released from the storage area and for holding the same in readiness for further delivery. Tray stop 16 is also similar to tray stop 2 hereinbefore described. A limit switch LS5 is mounted on the outgoing conveyor between tray stop 16 and the storage area for locking tray stops 10, 12 and 14 to prevent release of further trays when a predetermined number of trays have accumulated against stop 16. Limit switch LS5 may be mounted on the outgoing conveyor at a selected distance from tray stop 16 depending upon the number of trays it is desired to accumulate against stop 16 in readiness for further delivery. It will be apparent that tray stop 16 may be energized by a manual switch or the like whenever it is desired to release trays for further delivery along outgoing conveyor OUT. For a more detailed description of a semi-automatic control system for operating a tray stop such as 16, reference may be had to R. J. Byrnes, J. T. Pence and B. O. Rae copending application Ser. No. 37,762 filed June 21, 1960, now Patent No. 3,011,621, dated December 5, 1961, and assigned to the assignee of the present invention.

Referring to FIGS. 2a and 2b, there is shown a control system for operating the conveyor system of FIG. 1. The control system generally comprises a suitable three-phase alternating current power supply source, not shown, connectable to power supply lines L1, L2 and L3, a motor control circuit 18 for controlling operation of the storage ledge conveyor motors, a filling control circuit 20 enclosed in broken lines for controlling admission of trays onto the storage ledge conveyors and a delivery control circuit 22 enclosed in broken lines for controlling release of trays from the storage ledge conveyors onto the outgoing conveyor.

Filling control circuit 20 is provided with means for controlling admission of articles and for diverting the same to the storage conveyors to fill the latter with such articles in a predetermined order. That is, the order in which the storage conveyors are filled is predetermined by building it into the filling control circuit. To this end, the filling control circuit is provided with a stepping switch having an operating position for each storage conveyor in which position the stepping switch controls the filling of the corresponding storage conveyor and steps to the next position as hereinafter described in more detail to control filling of another storage conveyor when the storage conveyor corresponding to the preceding operating position has been filled. The order in which the storage conveyors are filled is predetermined by the order in which the operating and diverting controls for the respective storage conveyors are connected to the successive operating position contacts of the stepping switch.

Delivery control circuit 22 is provided with means operable for controlling release of articles from the storage conveyors in a predetermined order onto the outgoing conveyor for delivery by the latter. That is, the means controls emptying of the storage conveyors in a predetermined order. Articles are released from one storage conveyor until it is empty whereafter articles are released from another storage conveyor and so on. The order in which the storage conveyors are emptied is predetermined by building it into the delivery control circuit. To this end, the delivery control circuit is provided with a stepping switch having an operating position for each storage conveyor in which position the stepping switch controls the release of articles until the corresponding storage conveyor is empty and steps to the next position as hereinafter described in more detail to control release of articles from another storage conveyor. The order in which the storage conveyors are emptied is predetermined by the order in which the operating and releasing controls for the respective storage conveyors are connected to the successive operating position contacts of the stepping switch and in the embodiment illustrated is the same order as that in which the storage conveyors are filled. In this manner, as soon as a storage conveyor is emptied, the system operates to refill it.

The system is provided with memory means for registering information indicative of the number of articles in transit within the system at any time and information indicative of the destination of incoming ones of such in-transit articles and the storage conveyor origin of outgoing ones of such in-transit articles and for maintaining such registrations in the event of power failure or stopping of the conveyor system whereby upon reestablishment of power or restarting of the conveyor system such registrations are utilized to control conveyance of the articles that were stopped in transit to their previously intended destinations and to resume the pre-existing state of admission and release of articles, that is, to resume the interrupted filling and delivery operations in the pre-existing manner. For this purpose, the filling control circuit is provided with a stepping switch for counting the articles released from the incoming conveyor for a storage conveyor, an article-controlled limit switch and relays for operating such stepping switch and for preventing a false count upon disconnection and reestablishment of power and a stepping switch for registering the storage conveyor destination of the released articles. These stepping switches remain in their operating positions during disconnection and reestablishment of power and thereby constitute memory means whereby the filling operation is resumed in the pre-existing manner. The delivery control circuit is provided with a stepping switch for counting the articles released from the storage conveyor being emptied, an article-controlled limit switch for each storage conveyor and relays common thereto for operating such stepping switch and for preventing a false count upon disconnection and reestablishment of power and a stepping switch for registering the storage conveyor origin of the released articles. These stepping switches remain in their operating positions during disconnection and reestablishment of power and thereby constitute memory means whereby the delivery operation is resumed in the pre-existing manner.

The system is further provided with means for controlling withdrawal of articles from the storage conveyors until a predetermined number of articles are available for delivery and thereupon to stop such withdrawal thereby to maintain such predetermined number of articles available for delivery at all times on the outgoing conveyor. For this purpose, the delivery control circuit is provided with an article-operated limit switch for controlling a timing device to discontinue the release of articles from the storage conveyors and an article stop. The number of articles that are maintained for delivery on the outgoing conveyor is predetermined by building it into the system, that is, such number is predetermined by the distance that the stop and limit switch are mounted on the outgoing conveyor from the storage conveyor and the time interval of the timing device as hereinafter more fully described.

A plurality of electrical motors M1, M2 and M3 of the plural-phase alternating circuit type or the like are provided for driving storage ledge conveyors Nos. 1, 2 and 3, respectively. While only three storage ledge conveyors and motors therefor have been shown for ease of illustration, it will be apparent that any desired number of storage ledge conveyors may be employed in the system. The manner in which additional storage ledge conveyors and motors therefor can be incorporated in the system will become apparent as the description proceeds. Motors M1, M2 and M3 are connectable to power supply lines L1, L2 and L3 through normally opened contacts of main contactors 24, 26 and 28 respectively. One of the storage ledge conveyor motors must be operated to drive the corresponding storage ledge conveyor whenever trays are admitted from the incoming conveyor into the storage area and must also be operated to drive the associated storage ledge conveyor whenever trays are released from the storage area onto the outgoing conveyor. For this reason, each main contactor 24, 26 and 28 is provided in its energizing circuit with a pair of normally open contacts, the contacts of each such pair being connected in parallel in the energizing circuit of the operating coil of the associated contactor. One such contact of each pair is controlled by the filling control circuit and the other such contact is controlled by the delivery control circuit as hereinafter described.

A totalizing counter 30 is provided for giving a continuous visual indication of the total number of trays in storage at any given time. Counter 30 is of the adding and subtracting type and is provided with an adding coil 30a which advances the counter one step for each tray that enters the storage area and a subtracting coil 30b which steps back the counter one step for each tray that leaves the storage area. Counter 30 is also provided with a window 30c affording a visual indication of the resultant count.

Filling control circuit 20 is provided with a lamp 32 for indicating energization of the circuit. Limit switch LS1, which is also shown in FIG. 1, is provided with a normally open contact 1 for controlling the operating coil of a counting relay 34 to count each tray that is released by stopping mechanism 2. Normally closed contact 2 of limit switch LS1 controls the operating coil of a control relay 36 to prevent, in the event of power failure or disconnection, a false count when the power is reestablished.

Filling control circuit 20 is also provided with a counter or stepping switch 38 for controlling admission of trays to the storage ledge conveyors in succession. Switch 38 is preferably of the rotary stepping type and is provided with a ratchet wheel 38a which is stepped in the clockwise direction by a driving pawl 38b under the control of an operating magnet coil 38c to register the filling of each storage conveyor. A contact brush 38d is secured to ratchet wheel 38a for successively engaging a plurality of stationary contacts 1, 2, 3 etc. equal in number to the number of storage ledge conveyors in the system. The operating coils of a plurality of control relays 40, 42 and 44 are connected to the respective contacts of switch 38 for controlling the operating coils of storage ledge motor main contactors 24, 26 and 28 and operating coils 4d, 6d and 8d of diverter mechanism 4, 6 and 8, respectively. While only three relays 40, 42, and 44 have been shown, it will be apparent that the operating coil of a similar control relay would actually be connected to each contact of switch 38 except any unused or vacant contacts such as the last contact X to serve additional storage ledge conveyors, not shown. The operating coil of a relay 46 is connected to the last contact X of switch 38 for recycling the switch, that is, for controlling stepping of contact brush 38d from the last contact X to contact 1.

A switching counter 48 is provided for controlling energization of a lamp 50 to indicate that the storage area is full and for also controlling operating coil 2d of tray stop 2 to prevent admission of further trays when the storage area is full. Counter 48 is provided with a ratchet wheel 48a which is stepped in the clockwise, adding direction by an operating magnet coil 48b, to register the filling of storage conveyors and which is stepped in the counterclockwise, subtracting direction by an operating magnet coil 48c to register the emptying of storage conveyors. Counter 48 is provided with a normal zero position 0 and a plurality of operating positions 1, 2, 3–Y equal in number to the number of storage ledge conveyors in the system. A switch operating cam 48d is mounted on ratchet wheel 48a so as to be effective in operating position Y thereof, operating position Y being indicative of the total number of storage ledge conveyors in the system. Counter 48 is further provided with a normally open switch 48e for controlling full indicating lamp 50 and a normally closed switch 48f for controlling operating coil 2d of tray stop 2.

A counter 52 is provided for counting and controlling the number of trays to be admitted to each storage ledge conveyor. Counter 52 is in the nature of a rotary stepping switch having a ratchet wheel 52a which is stepped in the clockwise direction by a pawl 52b under the control of an operating coil 52c to register the admission of each tray of a train thereof. Switch 52 is driven one step each time a tray passes over limit switch LS1. Counter 52 is provided with a normal zero position 0 and a plurality of operating positions 1, 2, 3–N, equal in number to the number of trays that can be accommodated by each storage ledge conveyor. A contact brush 52d is secured to ratchet wheel 52a and is stepped with the latter to engage contact N when the last tray for each storage ledge passes over limit switch LS1. The operating coil of a control relay 54 is connected to contact N of counter 52. Relay 54 controls a timer 56 whereby to control the aforementioned recycling of switch 38 and also controls tray stop 2 for a predetermined time interval while the admission of trays is switched from one storage ledge conveyor to another. Timer 56 is of a well known type having a predetermined timing interval of the order of 60 seconds or the like for closing its contact following energization of its operating coil to afford time for the last tray of each train to enter a storage conveyor.

Delivery control circuit 22 is provided with a lamp 58 for indicating energization of this circuit. Limit switches LS2, LS3 and LS4, which are also shown in FIG. 1, are each provided with a normally open contact 1 and a normally closed contact 2. Normally open contact 1 of each of these limit switches controls a counting control relay 60 for counting the number of trays released from the storage ledge conveyors onto the outgoing conveyor. Normally closed contacts 2 of these limit switches control a relay 62 to prevent, in the event of a power failure, a false count when the power is reestablished. While only three limit switches LS2, LS3 and LS4 have been shown, it will be apparent that a similarly connected limit switch would actually be provided for each additional storage ledge conveyor.

Delivery control circuit 22 is also provided with a counter or stepping switch 64 for controlling the release of trays from the storage ledge conveyors in succession. Switch 64 is preferably of the rotary stepping type similar to switch 38 and is provided with a ratchet wheel 64a which is stepped in the clockwise direction by a pawl 64b under the control of an operating coil 64c to register the emptying of each storage conveyor. Switch 64 is provided with a plurality of stationary contacts 1, 2, 3, etc. equal in number to the number of storage ledge conveyors in the system. Contacts 1, 2 and 3 are connected to the operating coils of control relays 66, 68 and 70, respectively, for controlling tray stops 10, 12 and 14 and for controlling the main contactors of the storage ledge motors, respectively. While only three relays 66, 68 and 70 have been shown for ease of illustration, it will be apparent that a similar relay would actually be provided for each additional storage conveyor and connected to each contact of switch 64 except any unused or vacant contacts such as the last contact X. Contact X of switch 64 is connected to the operating coil of a control relay 72 for controlling recycling of switch 64, that is, for controlling stepping of switch 64 from contact X to contact 1.

Limit switch LS5 controls the release of trays from the storage ledge conveyors onto the outgoing conveyor. Limit switch LS5 is normally closed and opens whenever a tray engages the same. Limit switch LS5 is connected to an operating coil 74 of a timer switch to prevent jogging of the delivery control circuit when trays pass over the limit switch. Timer coil 74 controls tray stops 10, 12 and 14 under the control of limit switch LS5 to prevent release of further trays when a predetermined number of trays have been delivered and a tray comes to rest on limit switch LS5.

A counter 76 is provided for counting the number of trays released from each storage ledge conveyor onto the outgoing conveyor. Counter 76 is in the nature of a rotary stepping switch similar to switch 52 and is provided with a ratchet wheel 76a which is stepped in the clockwise direction by a pawl 76b under the control of an operating coil 76c to register the release of each tray of a train thereof. Switch 76 is provided with a normal zero position 0 and a plurality of operating positions 1, 2 and 3–N, position N being indicative of the total number of trays that can be accommodated by a single storage ledge conveyor. A contact brush 76d is secured to ratchet wheel 76a and rotates therewith to engage a last contact N when the last tray from a storage ledge conveyor has been released. The operating coil of a control relay 78 is connected to contact N of switch 76 for controlling a timer 80 affording time for the last tray of a train to enter the outgoing conveyor and for locking out tray stops 10, 12 and 14 while the delivery is switched from one storage ledge conveyor to another. Timer 80 is of a well known type having a predetermined timing interval of the order of 10 seconds or the like for controlling reverse stepping of counter 48, for controlling the aforementioned recycling of switch 64 and for controlling stepping of switch 76 to its manual zero position.

The operation of the system will now be described.

Let it be assumed that incoming conveyor IN and outgoing conveyor OUT are running. Let it also be assumed that power is connected to supply lines L1, L2 and L3 at the upper portion of FIG. 2a. Indicating lamps 32 and 58 are energized and are lit to indicate that power has been supplied to filling control circuit 20 and delivery control circuit 22. The operating coil of relay 36 is energized through contact 2 of limit switch LS1 across supply lines L1 and L2. Normally open contact 36a closes to complete a maintaining circuit in shunt of contact 2 of limit switch LS1 to maintain relay 36 energized. Normally open contact 36b closes to complete a point in the energizing circuit of the operating coil of relay 34. The operating coil of relay 40 energizes in a circuit extending from line L1 through its operating coil, contact 1 and brush 38b of switch 38 to line L2. Relay 40 closes normally open contact 40a to complete an energizing circuit for the operating coil of contactor 24 across lines L1 and L2. Normally open contact 40b closes to complete an energizing circuit for operating coil 4d of diverter mechanism 4 across lines L1 and L2. As a result, contactor 24 closes its normally opened contacts 24a, 24b and 24c to apply power to motor M1 and start storage ledge conveyor No. 1 running. Energization of operating coil 4d causes actuation of diverter mechanism 4 to its diverting position shown in dotted lines in FIG. 1. The filling control system is now ready for accepting trays from the incoming conveyor.

In delivery control circuit 22, the operating coil of relay 62 energizes in a circuit extending from line L1 through contacts 2 of limit switches LS2, LS3 and LS4 and its operating coil to line L2. Normally open contact 62 closes to complete a maintaining circuit in shunt of contacts 2 of the limit switches to maintain the operating coil of relay 62 energized. Normally open contact 62b closes to complete a point in the energizing circuit of the operating coil of relay 60. The operating coil of relay 66 energizes in a circuit extending from line L1 through its operating coil and contact 1 and brush 64d of switch 64 to line L2. Normally open contact 66a closes to complete an energization circuit in shunt of the then closed contact 40a for the operating coil of contactor 24. Normally open contact 66b closes to complete a point in the energizing circuit of operating coil 10d of tray stop 10.

Let it be assumed that limit switch LS5 is open as shown in dotted lines in the lower portion of FIG. 2a so that the operating coil 74 of the timer is deenergized. As a result, the energizing circuit of operating coils 10d, 12d and 14d of tray stops 10, 12 and 14, respectively, is open at normally open contact 74a. Delivery control circuit 22 is now ready for releasing trays from storage ledge conveyor No. 1.

Continuing with the description of operation of filling control circuit 20, it will be apparent that operating coil 2d of tray stop 2 energizes in a circuit extending from supply line L1 through normally closed contact 54a of relay 54, normally closed switch 48f of counter 48 and normally closed contact 34a of relay 34 and its operating coil to supply line L2. Assuming that at this time a number of trays are backed up against tray stop 2 on the incoming conveyor, the first tray pushes against pins 2c of tray stop 2 to rotate shaft 2b thereof thereby to unblock the tray and permit the latter to travel along incoming conveyor IN. It will be apparent that the energization of operating coil 2d unlatches tray stop to release a tray.

When the first tray engages limit switch LS1, contact 1 thereof closes to complete an energizing circuit for the operating coil of relay 34 through the then closed contact 36b. Contact 2 of limit switch LS1 opens without effect as the operating coil of relay 36 is maintained energized through the then closed contact 36a. Normally closed contact 34a opens to interrupt energization of coil 2d. As a result, tray stop 2 is reset into readiness to stop the next tray momentarily. Normally open contact 34b closes to complete an energizing circuit for operating coil 52c of counter 52 to cause pawl 52b to be extended to engage the next tooth on ratchet wheel 52a. Energization of coil 52c effects opening of normally closed contact 52e but without effect at this time.

When the first tray passes over limit switch LS1 to disengage the same, contact 1 thereof reopens and contact 2 thereof recloses. In the meantime, tray stop 2 has engaged the second tray to stop the same thereby to space the second tray from the first tray by a distance corresponding to the distance between tray stop 2 and limit switch LS1. The operating coil of relay 34 deenergizes to reclose contact 34a and to reopen contact 34b. The latter interrupts energization of coil 52c whereupon pawl 52b is retracted by a suitable spring or the like to cause rotation of ratchet wheel 52a one step in the clockwise direction wherein brush 52d stops at operating position 1. The aforementioned reclosure of contact 34a causes reenergization of operating coil 2d of tray stop 2 to release the second tray.

Each time that the operating coil of relay 34 is energized, that is, once for each tray, adding coil 30a of counter 30 is also energized in parallel therewith. This causes counter 30 to step in the forward direction and to display at window 33 thereof the total number of trays that have passed limit switch LS1 into storage.

Filling control circuit 20 operates in the aforedescribed manner to count the trays as they are released and spaced from one another by tray stop 2. Counter 52 and counter 30 are each advanced one step for each tray and tray stop 2 is intermittently operated to space the trays a short distance from one another. Diverting mechanism 4 being in its diverting position shown in dotted lines in FIG. 1, the spaced trays are turned and diverted from incoming conveyor IN onto storage ledge conveyor No. 1.

Means are provided in filling control circuit 20 to lock tray stop 2 and to stop the incoming trays when a sufficient number of trays have been released thereby to fill storage ledge conveyor No. 1. It will be apparent that the number of trays that are required to fill storage ledge conveyor No. 1 depends on the length of the latter and for purposes of description is indicated by N on counter 52.

When the last tray of the train of N trays engages limit switch LS1, contact 1 of the latter closes to energize the operating coil of relay 34 and adding coil 30a of counter 30 thereby to stop counter 30 to its N indicating position. Contact 34a opens to deenergize coil 2d of tray stop 2 thereby to cause the latter to stop the remaining trays. Contact 34b closes to energize operating coil 52c of counter 52 whereupon pawl 52b is extended to engage the next tooth on ratchet wheel 52a.

When such last tray disengages limit switch LS1, contact 1 thereof reopens to deenergize the operating coil of relay 34. It will be apparent that deenergization of the operating coil of relay 34 causes opening of contact 34b before contact 34a closes. As a result, coil 52c is deenergized and counter 52 is stepped to operating position N to complete an energizing circuit for the operating coil of relay 54 through contact brush 52d and contact N. Normally closed contact 54a opens to prevent reenergization of operating coil 2d of tray stop 2 upon closure of contact 34a. Normally open contact 54b closes to complete a point in the energizing circuit of coil 38c of switch 38 and adding operating coil 48b of counter 48. Normally open contact 54c closes to complete an energizing circuit for the operating coil of timer 56 across lines L1 and L2.

After a predetermined time interval, sufficient to allow time for all the trays of the first train to be diverted onto storage ledge conveyor No. 1, timer 56 times out and closes normally open contact 56a. As a result, an energizing circuit is completed from line L2 through contacts 56a and 54b and then through one branch extending through normally closed contact 46a of relay 46 and adding operating coil 48b of counter 48 to line L1 and through a second branch extending through operating coil 38c of switch 38 to line L1. Energization of coil 48b causes stepping of counter 48 one step in the clockwise, adding direction. Energization of coil 38c causes extension of pawl 38b to engage the next tooth on ratchet wheel 38a. The aforementioned closure of contact 56a also completes an energizing circuit from line L2 therethrough and through normally closed self-interrupting contact 52e and coil 52c to line L1 to cause coil 52c to energize and to extend pawl 52b to engage the next tooth on ratchet wheel 52a. Immediately thereafter, self-interrupting contact 52e opens to interrupt energization of coil 52c whereupon pawl 52b is retracted to step counter 52 from contact N to its normal zero position. Interruption of the energizing circuit of the operating coil of relay 54 by counter 52 causes reopening of contacts 54b and 54c and reclosure of contact 54a. As a result, coil 38c is deenergized to cause retraction of pawl 38b to step switch 38 from contact 1 to contact 2. The operating coil of timer 56 is deenergized to cause reopening of contact 56a.

The aforementioned stepping of switch 38 from contact 1 to contact 2 causes deenergization of the operating coil of relay 40 and energization of the operating coil of relay 42. Contact 40a reopens to deenergize the operating coil of contactor 24 and contacts 24a, 24b and 24c of the latter reopen to stop motor M1 of storage ledge conveyor No. 1. However, if switch 64 in the delivery control circuit is resting at operating position 1 at this time, the operating coil of contactor 24 remains energized through contact 66a and motor M1 continues to run storage ledge conveyor No. 1. Contact 40b reopens to deenergize operating coil 4d of diverter 4 thereby to permit the latter to be returned to its normal straight ahead position by a suitable spring or the like. Energization of the operating coil of relay 42 affects closure of normally open contact 42a to energize the operating coil of contactor 26. The latter closes its normally open contacts 26a, 26b and 26c to energize motor M2 and to start storage ledge conveyor No. 2 running. Normally open contact 42b closes to energize operating coil 6b of diverter 6 thereby to actuate the latter into its diverting position in preparation for diverting a second train of trays onto storage ledge conveyor No. 2. The aforementioned closure of contact 54a of relay 54 causes reenergization of operating coil 2d of tray stop 2 whereby to start the release of a second train of trays for storage ledge conveyor No. 2.

Storage ledge conveyors Nos. 2 and 3 are then filled with trays in the manner described in connection with storage ledge conveyor No. 1. In this connection, it will be apparent that in operating position 3, brush 38d of switch 38 will engage contact 3 to energize the operating coil of relay 44. Normally open contact 44a will close to energize the operating coil of contactor 28 and normally open contact 44b will close to energiez operating coil 8d of diverter 8. Contactor 28 closes its normally open contacts 28a, 28b and 28c to energize motor M3 to run storage ledge conveyor No. 3. Energization of coil 8d causes actuation of diverter 8 to its diverting position. Any additional storage ledge conveyors as provided are then filled with trays in a similar manner.

When the last tray of the last train of trays disengages limit switch LS1, contact 1 thereof opens to deenergize the operating coil of relay 34. Contact 34b opens to deenergize coil 52c to step counter 52 to contact N. The operating coil of relay 54 is energized through brush 52d and contact N of counter 52 to open contact 54a and to close contacts 54b and 54c. Timer 56 energizes and after a predetermined time interval sufficient to allow time for the last train of trays to be diverted onto the last storage ledge conveyor contact 56a closes. The aforementioned closure of contact 56a causes energization of adding coil 48b of counter 48 to step the latter to operating position Y. Closure of contact 56a also causes energization of coil 38c of switch 38 to extend pawl 38b to engage the next tooth on ratchet wheel 38a. Closure of contact 56a further causes energization of coil 52c of counter 52 to extend pawl 52b to engage the next tooth on ratchet wheel 52a. Self-interrupting contact 52e opens to deenergize coil 52c whereupon pawl 52b is retracted to step counter 52 from contact N to its normal zero position. As a result, the operating coil of relay 54 deenergizes to open contacts 54b and 54c and to close contact 54a.

The aforementioned stepping of counter 48 to operating position Y causes cam 48d thereof to close switch 48e and to open switch 48f. Lamp 50 is lit in a circuit extending through contact 54a and switch 48e to indicate that all of the storage ledge conveyors are full of trays. Switch 48f interrupts the energizing circuit of coil 2d of tray stop 2 thereby to lock the tray stop to prevent the release of further trays towards the storage area. Opening of contact 54b of relay 54 interrupts the energizing circuit of coil 38c of switch 38 thereby to effect retraction of pawl 38b and to step switch 38 so that brush 38d thereof engages contact X. Opening of contact 54c of relay 54 interrupts energization of timer 56 causing the latter to reopen contact 56a. Switch 38 completes an energizing circuit through its contact brush 38d and contact X to energize the operating coil of relay 46. Normally closed contact 46a opens to prevent further energization of coil 48b of counter 48. Normally open contact 46b closes to complete an energizing circuit through normally closed self-interrupting contact 38e for coil 38c of switch 38. As a result, pawl 38b is extended to engage the next tooth on ratchet wheel 38a. Immediately thereafter, contact 38e opens to interrupt energization of coil 38c whereupon pawl 38b is retracted to step switch 38 from contact X to contact 1. This causes deenergization of the operating coil of relay 46 to restore its contacts to the position shown. Contact 38e recloses. In this position, switch 38 causes reenergization of the operating coil of relay 40 to prepare for refilling of storage ledge conveyor No. 1 after it has been emptied as hereinafter described.

It will be apparent that the storage area is now full of trays and operating coil 2d of tray stop 2 is locked out at switch 48f to hold back the remaining trays on the incoming conveyor until such time as the trays from one storage ledge conveyor are delivered to the outgoing conveyor. Filling control circuit 20 remains in this condition with the operating coil of relay 36 energized through contact 2 of limit switch LS1. The operating coil of relay 40 is also energized through brush 38b and contact 1 of switch 38. The operating coil of contactor 24 is energized through contact 40a of relay 40 and contacts 24a, 24b and 24c of contactor 24 are closed so that motor M1 of storage ledge conveyor No. 1 is running. Also, operating coil 4d of diverter 4 is energized through contact 40b to maintain the same in its diverting position. Visual indicator counter 30 is in an operating position indicative of the total number of trays stored on all of the storage ledge conveyors and lamp 50 is lit to indicate that the storage area is full.

The operation of delivery control circuit 22 will now be described. In delivery control circuit 22 as hereinbefore described, lamp 58 is lit to indicate that the circuit is energized. The operating coil is relay 62 is energized and is maintained energized through its contact 62a. The operating coil of relay 66 is energized through brush 64d and contact 1 of switch 64. The operating coil of contactor 24 is energized through contact 66a. Contact 66b has closed a point in the energizing circuit of operating coil 10d of tray stop 10. However, operating coil 10d of tray stop 10 is maintained deenergized at normally open timer contact 74a until such time as it is desired to withdraw trays from the storage area. Delivery control circuit 22 remains in this condition until such time as limit switch LS5 is closed to initiate withdrawal of trays from storage ledge conveyor No. 1. Limit switch LS5 is normally closed and is opened whenever a tray engages the same. When a predetermined number of trays are backed up against tray stop 16 in FIG. 1 so that a tray rests on limit switch LS5, the latter remains open as shown in dotted lines in FIG. 2b to maintain timer coil 74 deenergized and contact 74a open. In this condition, all the tray stops of the storage ledge conveyors are locked out so that trays cannot be released therefrom.

Let it now be assumed that the operating coil of tray stop 16 in FIG. 1 is energized to release the trays and to permit the same to travel along the outgoing conveyor. As the trays pass over limit switch LS5, the latter is momentarily closed in each space between the trays and reopened when it is engaged by the next tray. The RC circuit comprising resistor R and capacitor C in series which is connected across timer coil 74 is provided to prevent closure of contact 74a in response to such intermittent closure of limit switch LS5. Each time limit switch LS5 intermittently closes, capacitor C begins to charge. However, limit switch LS5 reopens before capacitor C has had time to charge sufficiently to cause energization of timer coil 74. When the last tray that was resting on the outgoing conveyor passes limit switch LS5, the latter remains closed. As a result, capacitor C charges and after a predetermined time interval coil 74 energizes to close contact 74a. Contact 74a completes an energizing circuit for operating coil 10d of tray stop 10 through contacts 60a, 78a and 66b to permit tray stop 10 to release a tray from storage ledge conveyor No. 1 onto the outgoing conveyor.

As the first tray engages limit switch LS2, contact 1 of the latter closes to complete an energizing circuit for the operating coil of relay 60 through the then closed contact 62b. Subtracting coil 30b of counter 30 in the right-hand portion of FIG. 2a is also energized in parallel with the operating coil of relay 60. Coil 30b of counter 30 steps the latter back one step for each tray that is released thereby to maintain a continuous indication of the number of trays in storage. Relay 60 opens normally closed contact 60a to interrupt energization of coil 10d of tray stop 10 thereby to cause the latter to stop the next tray and to space the trays from one another. Normally open contact 60b closes to complete an energizing circuit for operating coil 76c of counter 76 and to cause extension of pawl 76b to engage the next tooth on ratchet wheel 76a.

When the first tray released from storage ledge conveyor No. 1 disengages the limit switch LS2, contact 1 of the latter reopens to deenergize the operating coil of relay 60 and also to deenergize coil 30b of counter 30 to reset the latter into readiness for taking the next subtracting step. Contact 60b reopens to deenergize operating coil 76c of counter 76 whereupon pawl 76b is retracted to step counter 76 from its normal zero position to operating position 1. Contact 60a recloses to complete an energizing circuit for operating coil 10d of tray stop 10 thereby to permit the latter to release the next tray.

Delivery control circuit 22 then continues to operate in the aforedescribed manner under the control of limit switch LS2 to count each tray and to register such count at window 30c of counter 30 and to step counter 76 one step for each tray. The intermittent deenergization of coil 10d of tray stop 10 causes spacing of the released trays by a distance equal to the distance between tray stop 10 and limit switch LS2. As the released trays travel along outgoing conveyor OUT over limit switch LS5, the intermittent opening of the latter as each tray passes thereover causes initiation of discharge of capacitor C. However, resistor R is selected of such a value as to present complete discharge of capacitor C during these time intervals and timer coil 74 is maintained energized and contact 74a is maintained closed.

When the last tray from storage ledge conveyor No. 1 engages limit switch LS2, contact 1 of the latter closes to energize the operating coil of relay 60. Contact 60a opens to deenergize coil 10d of tray stop 10 thereby to lock the latter in its stopping position. Contact 60b closes to complete an energizing circuit for coil 76c of counter 76 and to extend pawl 76b to engage the next tooth on ratchet wheel 76a. When such last tray passes over and disengages limit switch LS2, contact 1 thereof reopens to deenergize the operation coil of relay 60. Contact 60b opens to deenergize coil 76c whereupon pawl 76b is retracted to rotate brush 76d of counter 76 into engagement with contact N. As a result, the operating coil of relay 78 energizes to open normally closed contact 78a and to close normally open contacts 78b and 78c. The aforementioned deenergization of the operating coil of relay 60 also causes closure of contact 60a without effect, however, because contact 78a opens to maintain the energizing circuit of coil 10d interrupted. Contact 78b closes a point in the energizing circuits of subtracting coil 48c of counter 48 and operating coil 64c of switch 64. Contact 78c completes an energizing circuit for the operating coil of timer 80.

After a predetermined time interval sufficient to allow time for the last tray to leave storage ledge conveyor No. 1 and to enter upon outgoing conveyor OUT, timer 80 times out and closes normally open contact 80a. Contact 80a completes an energizing circuit through contacts 78b and 72a for operating coil 48c of counter 48 thereby to cause the latter to be stepped one step in the counterclockwise, subtracting direction and to cause cam 48d to reopen switch 48e and to reclose switch 48f. Contact 80a also completes an energizing circuit through contact 78b for coil 64c of switch 64 to cause extension of pawl 64b to engage the next tooth on ratchet wheel 64a. Contact 80a further completes an energizing circuit through normally closed self-interrupting contact 76e for coil 76c of counter 76 to cause extension of pawl 76b to engage the next tooth on ratchet wheel 76a.

Energization of coil 76c causes opening of its contact 76e to deenergize the coil whereupon pawl 76b is withdrawn to step counter 76 from contact N to its normal zero position whereafter contact 76e recloses. Such stepping of counter 76 to its normal position causes deenergization of the operating coil of relay 78 to open contacts 78b and 78c and to reclose contact 78a. Contact 78c interrupts energization of timer 80 to open contact 80a. Contact 78b causes interruption of the energizing circuit of coil 64c to cause withdrawal of pawl 64b to rotate contact brush 64d from contact 1 into engagement with contact 2 to deenergize the operating coil of relay 66 and to energize the operating coil of relay 68. Contact 66a opens to interrupt energization of the operating coil of contactor 24 and contact 66b opens to prevent further energization of operating coil 10d of tray stop 10. Contactor 24 opens contacts 24a, 24b and 24c to stop motor M1. However, if switch 38 in filling control circuit 20 is resting at operating position 1 at this time, the operating coil of contactor 24 remains energized through contact 40a and motor M1 continues to run storage ledge conveyor No. 1 in readiness for refilling the latter. Normally open contact 68a closes to complete an energizing circuit for the operating coil of contactor 26 whereupon the latter closes its contacts 26a, 26b and 26c to energize motor M2 and to start storage ledge conveyor No. 2. Contact 68b closes to complete an energizing circuit for operating coil 12d of tray stop 12 in a circuit extending also through contacts 78a, 60a and 74a. This causes tray stop 12 to start releasing trays from storage ledge conveyor No. 2 unto the outgoing conveyor.

Delivery control circuit 22 then operates in a manner similar to that described in connection with storage ledge conveyor Number 1 to withdraw trays from storage ledge conveyors Nos. 2 and 3. In this connection, it will be apparent that in operating position 3, brush 64d of switch 64 will engage contact 3 to energize the operating coil of relay 70. Normally open contact 70a will close to energize the operating coil of contactor 28 and normally open contact 70b will close to energize operating coil 14d of tray stop 14. Contactor 28 closes its contacts 28a, 28b and 28c to energize motor M3 and to run storage ledge conveyor No. 3. Energization of coil 14d permits tray stop 14 to release trays from storage ledge conveyor No. 3. Any additional storage ledge conveyors as provided are then operated in a similar manner to empty the same of trays, whereafter switch 64 is stepped from contact X to contact 1 under the control of relay 72, its normally open contact 72b and self-interrupting normally closed contact 64e, normally closed contact 72a of relay 72 preventing operation of counter 48 during such stepping.

It will be apparent that the trays are withdrawn from the storage ledge conveyors in the same order as they were admitted thereto, that is in a first-in first-out order. This withdrawal of trays from storage continues provided limit switch LS5 is not maintained open for a time interval sufficient to cause deenergization of timer coil 74.

It will be apparent that the withdrawal of trays from storage can be stopped at any time by opening limit switch LS5 and maintaining the same open. As a result, capacitor C discharges through resistor R and timer coil 74 for a predetermined time interval whereafter coil 74 deenergizes to open contacts 74a. Contact 74a interrupts energization of the operating coil of any storage ledge tray stop which may be energized thereby to prevent further release of trays therefrom. The release of trays from storage may be restarted thereafter by reclosing limit switch LS5.

It will be recalled that when all the trays were released from storage ledge conveyor No. 1, coil 48c was energized to step counter 48 one step in the counterclockwise direction and to open switch 48e and to close switch 48f. This action conditions filling control circuit 20 to control admission of further trays into the storage area. Switch 48e interrupts energization of lamp 50 to extinguish the same and to indicate that the storage area is no longer full. Switch 48f completes an energizing circuit through contacts 54a and 34a for operating coil 2d of tray stop 2 whereupon the latter again starts to admit trays toward the storage area. In this manner, as soon as each storage ledge conveyor has been emptied of trays, filling control circuit 20 is automatically operated to admit additional trays to fill the storage area and to automatically stop further admission of trays when the storage area is again full.

Means are incorporated in both filling control circuit 20 and in delivery control circuit 22 to register information relative to each step of the filling and delivery operations and to maintain storage of this information in the event of power failure so that upon reestablishment of power the trays will be delivered correctly to the places to which they were intended. In other words, the system in effect remembers the location of each tray that is in transit and correctly and automatically delivers such tray when the power is reestablished. This is a significant improvement over prior systems wherein, in the event of power failure, all trays in transit must be manually lifted off the conveyors and carried back to their starting points in order to obtain correct delivery thereof when the power is reestablished.

In filling control circuit 20 these memory devices comprise stepping switch 38 and counters 48 and 52 including adding coil 48b of counter 48. It will be apparent that regardless of the point at which the system is stopped, counter 52 will have registered the number of trays that have passed limit switch LS1. Also, switch 38 will have registered information indicative of the storage ledge conveyor which is being filled. Moreover, counter 48 will have registered information indicative of the number of storage ledge conveyors that have been filled so that the filling operation will be stopped when the storage area is full.

In delivery control circuit 22 these memory devices comprise stepping switch 64 and counter 76 and subtracting coil 48c of counter 48, this subtracting coil 48c being shown for ease of illustration within filling control circuit 20. It will be apparent that regardless of the point at which the delivery operation is stopped, counter 76 will have registered the number of trays that have passed a given one of the limit switches LS2, LS3 and LS4. Also switch 64 will have registered information indicative of the storage ledge conveyor which was being emptied at the time. Moreover, subtracting coil 48c of counter 48 will have registered information indicative of the number of storage ledge conveyors which have been emptied so that when power is reapplied the emptying operation will be correctly resumed and the filling operation will be stopped when the storage area is full. As counter 48, under the control of its adding coil 48b, registers information indicative of the number of storage ledge conveyors that have been filled at any given time and also registers, under the control of its subtracting coil 48c, information indicative of the number of storage ledge conveyors that have been emptied, it will be apparent that under conditions of concurrent filling and emptying, counter 48 will maintain a registration of the total number of storage ledge conveyors that are full at any given time to automatically control the filling control circuit accordingly.

To illustrate the effectiveness of the memory devices in filling control circuit 20, let it be assumed that storage ledge conveyor No. 1 is empty and that tray stop 2 has released N minus one trays. Let it also be assumed that the last one of these released trays is on limit switch LS1 when the power fails. Under this condition, contact 1 of limit switch LS1 is closed and contact 2 thereof is open. Tray stop 2 is stopping the Nth tray. Just before power failure, motor M1 was energized and storage ledge conveyor No. 1 was running. The incoming and outgoing conveyors were running. Contactor 24 was energized and relays 34, 36 and 40 were energized. Coils 52c, 4d and 30a were energized. Switch 38 was in position 1 and counter 52 was in the operating position two steps behind contact N thereof.

When power fails, motor M1 stops, contactor 24 is deenergized and relays 34, 36 and 40 and coils 52c, 4d and 30a are all deenergized. Such power failure causes deenergization of coil 52c of counter 52 to retract pawl 52b and step brush 52d into the operating position directly behind contact N. The incoming and outgoing conveyors stop. During the failure and reestablishment of power, switch 38 remains in position 1 as the energizing circuit of coil 38c is open at contact 54b. Counter 48 also remains in the position in which it is at this time because the energizing circuit of adding coil 48b is open at contact 54b.

Means comprising relay 36 is provided to prevent a false count when power fails while a tray is passing over limit switch LS1 and when the power is reestablished. The power failure causes deenergization of the operating coil of relay 36 to open contact 36a thereof to interrupt its maintaining circuit and to open contact 36b. As a result, when power is reestablished, the operating coil of relay 34 will not be energized to register a false count although contact 1 of limit switch LS1 is closed because contact 36b is open. It will be apparent that the operating coil of relay 34 cannot again be energized until the tray that was resting on limit switch LS1 disengages the latter and closes contact 2 of the limit switch to energize the operating coil of relay 36. This causes reclosure of contact 36a to maintain energization of the operating coil of relay 36 and also causes closure of contact 36b whereafter relay 34 registers a correct count when the next tray engages limit switch LS1 and closes contact 1 thereof.

When the power is reestablished, the operating coil of relay 40 is energized through brush 38d of switch 38 resting on contact 1 of the latter. Contact 40a closes to energize the operating coil of contactor 24 to close contacts 24a, 24b and 24c to energize motor M1 and start storage ledge conveyor No. 1 running. The incoming and outgoing conveyors start running. The tray that was resting on limit switch LS1 disengages the latter to close contact 2 thereof. The operating coil of relay 36 is energized and maintained through contact 36a. Contact 36b closes. When the Nth tray engages limit switch LS1, contact 1 thereof closes to energize the operating coil of relay 34 and adding coil 30a of counter 30 whereupon the latter is stepped once to register such tray. Contact 34a opens to deenergize coil 2d to stop the remaining trays. Contact 34b closes to energize coil 52c. When the Nth tray disengages limit switch LS1, contact 1 thereof opens to interrupt energization of the operating coil of relay 34. Contact 34b opens to interrupt energization of coil 52c to step counter 52 into engagement with contact N. The operation then continues in the manner hereinbefore described to operate relay 54 and timer 56, to step counter 48 clockwise, to step switch 38 to contact 2 and to step counter 52 to its normal zero position.

To illustrate the effectiveness of the memory devices in delivery control circuit 22, let it be assumed that storage ledge conveyor No. 2 is being emptied and that tray stop 12 has released N minus one trays. Let it also be assumed that the last one of these released trays is on limit switch LS3 when the power fails. Under this condition, contact 1 of limit switch LS3 is closed and contact 2 thereof is open. Just before power failure, the incoming and outgoing conveyors were running and motor M2 was energized and storage ledge conveyor No. 2 was running. Contactor 26 and relays 60, 62 and 68 were energized. Coils 76c and 30b were energized. Switch 64 was resting in position 2 and counter 76 was in the operating position two steps behind contact N thereof. Contact 60a being open and coil 12d being deenergized, tray stop 12 is stopping the Nth tray.

When power fails, the incoming and outgoing conveyors stop and motor M2 of storage ledge conveyor No. 2 stops, contactor 26 and relays 60, 62 and 68 and coils 76c and 30b are all deenergized. Deenergization of coil 76c causes retraction of pawl 76b to step switch 76 into the operating position directly behind contact N. During the failure and reestablishment of power, switch 64 remains in position 2 as the energizing circuit of coil 64c is open at contact 78b. Counter 48 also remains in the position in which it is at this time because the energizing circuit of subtracting coil 48c thereof is open at contact 78b.

Means comprising relay 62 is provided to prevent a false count when power fails while a tray is passing over limit switch LS3 and when the power is reestablished. The power failure causes deenergization of the operating coil of relay 62 to open contact 62a thereof to interrupt its maintaining circuit and to open contact 62b. As a result, when power is reestablished, the operating coil of relay 60 will not be energized to register a false count although contact 1 of limit switch LS3 is closed because contact 62b is open. It will be apparent that the energizing coil of relay 60 cannot again be energized until the tray that was resting on limit switch LS3 disengages the latter and closes contact 2 of the limit switch to energize the operating coil of relay 62. This causes reclosure of contact 62a to maintain energization of the operating coil of relay 62 and also causes closure of contact 62b whereafter relay 60 registers a correct count when the next tray engages limit switch LS3 and closes contact 1 thereof.

When the power is reestablished the operating coil of relay 68 is energized through switch 64 resting on contact 2 of the latter. Contact 68a closes to energize the operating coil of contactor 26 and to close contacts 26a, 26b and 26c to energize motor M2 and start storage ledge conveyor No. 2 running. The incoming and outgoing conveyors start running. The tray that was resting on limit switch LS3 disengages the latter to close contact 2 thereof. The operating coil of relay 62 is energized and maintained through contact 62a. Contact 62b closes. When the Nth tray engages limit switch LS3, contact 1 thereof closes to energize the operating coil of relay 60 and subtracting coil 30b of counter 30 whereupon the latter is stepped back once to register the delivery of such tray. Contact 60a opens to deenergize coil 12d to lock tray stop 12 in its stopping position. Contact 60b closes to energize coil 76c. When the Nth tray disengages limit switch LS3, contact 1 thereof opens to interrupt energization of the operating coil of relay 60. Contact 60b opens to interrupt energization of coil 76c to step counter 76 into engagement with contact N. The operating then continues in the manner hereinbefore described to operate relay 78 and timer 80, to step counter 48 counterclockwise, to step switch 64 to contact 3 and to step counter 76 to its normal zero position.

While the apparatus hereinbefore described is effectively adapted to fulfill the objects stated, we do not intend to confine our invention to the particular preferred embodiment of memory type storage conveyor system disclosed, inasmuch as it is susceptible of various modifications without departing from the scope of the appended claims.

We claim:

1. In a conveyor system having an incoming conveyor for conveying articles therealong, an outgoing conveyor for delivering such articles, and a plurality of storage conveyors extending between said incoming conveyor and said outgoing conveyor for storing articles in transit therebetween until such articles are released therefrom to said outgoing conveyor, the improvement comprising:
   (a) first control means for controlling admission of articles and for diverting the same from said incoming conveyor to said storage conveyors to fill the latter with such articles in a predetermined order, said first control means comprising:
   (b) means responsive to and indicative of a condition wherein at least one storage conveyor is capable of receiving articles,
   (c) means responsive to said condition indicating means for admitting articles from said incoming conveyor;
   (d) and means responsive to filling of each empty storage conveyor for diverting articles to another empty storage conveyor until all storage conveyors are full;
   (e) and second control means operable for controlling withdrawal of articles from said storage conveyors to empty the latter in a predetermined order onto said outgoing conveyor for delivery by the latter;
   (f) and means responsive to said second control means for operating said condition indicating means whereby to cause said admitting means and said diverting means to refill such empty storage conveyors.

2. The invention defined in claim 1, wherein said second control means comprises means responsive to the articles for controlling withdrawal of articles from said storage conveyors in the same order as they are admitted thereto.

3. The invention defined in claim 1, wherein said first and second control means comprise memory means for registering information indicative of the number of articles in transit within the system at any given time and information indicative of the destination of incoming ones of such in-transit articles and the storage conveyor origin of outgoing ones of such in-transit articles and for maintaining such registrations in the event of power failure or stopping of the conveyor system, and means responsive to reestablishment of power or restarting of the conveyor system for utilizing such registrations to control conveyance of the articles that were in transit to their previously initiated destinations and to resume the filling and delivery operations in the pre-existing manner.

4. The invention defined in claim 3, wherein said first and second control means comprise means responsive to failure or disconnection of power from the system for preventing a false registration of the number of articles in transit when the power is reestablished or reconnected.

5. The invention defined in claim 1, wherein said first control means comprises means for registering information indicative of the filling of each storage conveyor with articles, and stopping control means responsive to said registering means when all the storage conveyors are full for stopping the admission of articles from the incoming conveyor toward said storage conveyors, and wherein said second control means comprises means responsive to release of the articles from one storage conveyor for delivery by said outgoing conveyor for operating said registering means to render said stopping control means effective to control further admission of articles to fill said one storage conveyor.

6. The invention defined in claim 1, wherein said first control means comprises first stepping means operable to step in response to filling of each storage conveyor with articles and to control the filling of the next storage conveyor in sequence, said first stepping means being set to control initial filling of the storage conveyors in the order of their spacing in the direction of movement of the articles along said incoming conveyor, and means responsive to said first stepping means taking its last sequential step for recycling the same for a repeat sequence, and wherein said second control means comprises second stepping means operable to step in response to emptying of each storage conveyor of articles and to control the emptying of the next storage conveyor in sequence, said second stepping means being set to control initial emptying of the storage conveyors in the same order as they are initially filled, and means responsive to said second stepping means taking its last sequential step for recycling the same for a repeat sequence whereby the articles are stored and delivered in a first-in first-out order.

7. The invention defined in claim 1, wherein said first control means comprises a controllable stop mounted on said incoming conveyor and operable to admit articles toward said storage conveyors and to stop the remaining articles when said storage conveyors are full.

8. The invention defined in claim 7, wherein said first control means comprises a plurality of diverting mechanisms mounted in spaced relation along said incoming conveyor adjacent the entry ends of the respective storage conveyors, and means responsive to the articles admitted by said stop for actuating said diverting mechanisms from their non-diverting position to their diverting position sequentially in the order of their spacing from said stop and in repeated cycles when articles are released from said storage conveyors for delivery by said outgoing conveyor.

9. The invention defined in claim 8, wherein said means responsive to said admitted articles comprises a limit switch responsive to each article admitted by said stop, first register means responsive to said limit switch for counting numbers of admitted articles constituting trains thereof sufficient to fill the respective storage conveyors and for registering such counts, and second register means responsive to registration of each said train by said first register means for counting each storage conveyor as it is filled and for registering such count and for restoring each associated diverting mechanism to its non-diverting position and for actuating the next sequential diverting mechanism to its diverting position.

10. The invention defined in claim 9, wherein said means responsive to said admitted articles further comprises means responsive to registration of each said count by said first register means for delaying the operation of said second register means for a predetermined time interval sufficient to afford time for each train of articles to be conveyed from said limit switch and diverted to the associated storage conveyor before the associated diverting mechanism is restored.

11. The invention defined in claim 7, wherein said first control means further comprises a limit switch mounted on said incoming conveyor a predetermined distance beyond said stop, means normally operable to control said stop to admit an article for travel along the incoming conveyor toward said storage conveyors and comprising means responsive to engagement of said limit switch by each article for rendering said stop effective to stop each next article, and means responsive to disengagement of said limit switch by each such article for rendering said stop effective to admit each next article thereby to space the incoming articles by a distance equal to said predetermined distance and to avoid interference therebetween as the articles are diverted onto said storage conveyors.

12. The invention defined in claim 1, wherein said second control means comprises a plurality of controllable stops mounted near the exit ends of the respective storage conveyors for normally maintaining the articles in storage, selectively operable means for transmitting a delivery signal, and means responsive to said delivery signal for rendering said stops effective to release the articles from successive storage conveyors for delivery by said outgoing conveyor in the same order as said storage conveyors were filled and in repeated cycles.

13. The invention defined in claim 1, wherein said second control means comprises a plurality of electroresponsive stops mounted near the exit ends of the respective storage conveyors for normally maintaining the articles in storage and effective upon energization for releasing trays, timing means having a normally open contact in the energizing circuits of said stops which closes when said timing means times out a predetermined time interval after energization thereof and which reopens when said timing means times out a predetermined time interval after deenergization thereof, and a normally closed limit switch mounted on said outgoing conveyor for engagement by the articles to control deenergization of said timing means and opening of its contact to stop the release of articles whenever an article stops on said limit switch, and said timing means being effective to prevent opening of its contact responsive to intermittent operation of said limit switch when articles are passing thereover.

14. The invention defined in claim 1, wherein said second control means comprises a plurality of controllable stops mounted near the exit ends of the respective storage conveyors for normally maintaining the articles in storage, a plurality of limit switches mounted on the respective storage conveyors a predetermined distance beyond said stops, selectively operable means for transmitting a delivery signal, means responsive to said delivery signal for rendering the stop of the first-filled storage conveyor effective to release an article, means responsive to engagement of the associated limit switch by each article for rendering said stop effective to stop each next article, and means responsive to disengagement of said associated limit switch by each article for rendering said stop effective to release each next article thereby to space the released articles by a distance equal to said predetermined distance and to avoid interference therebetween as the released articles turn onto said outgoing conveyor.

15. In a conveyor system, a plurality of storage conveyors for storing article trays awaiting delivery, an incoming conveyor for supplying article trays to said storage conveyors, said incoming conveyor having a first portion along which the trays are conveyed toward said storage conveyors and a second integral portion having access to said storage conveyors and controllable stopping means between said first and second portions, and means for controlling said stopping means to admit trays from said first portion to said second portion and comprising diverter means associated with each storage conveyor for diverting trays from said second portion to said storage conveyors in sequence, said controlling means further comprising memory means for counting the trays and for registering information pertaining to the number of trays in transit that have been admitted to said second portion of said incoming conveyor and the storage conveyor destination thereof at any given time and for maintaining such registrations in the event of power disconnection, and means responsive to said registrations upon reestablishment of power for controlling delivery of said in-transit trays to their correct destination and for controlling said stopping means and said diverter means to fill said storage conveyors with trays in the pre-existing sequence.

16. The invention defined in claim 15, wherein said controlling means further comprises a limit switch mounted on said second portion of said incoming conveyor for operation by each tray admitted by said stopping means, first stepping means responsive to said limit switch for counting the trays of a train thereof sufficient to fill a first storage conveyor and for recycling to count the trays of a next train thereof, second stepping means responsive to each cycle of operation of said first stepping means for restoring the diverter means associated with the first storage conveyor and for actuating the diverter means associated with the next storage conveyor into its diverting position, third stepping means responsive to each cycle of operation of said first stepping means to count the filled storage conveyors, and means responsive to said third stepping means when all of the storage conveyors are filled for locking said stopping means to prevent admission of further articles to said second portion of said incoming conveyor.

17. The invention defined in claim 16, wherein said limit switch is provided with a normally open contact and a normally closed contact, said normally open contact being closed and said normally closed contact being opened when said limit switch is engaged by each tray, a first relay for controlling said first stepping means, a second relay energizable through said normally closed contact of said limit switch and having a first normally open interlocking contact in the energizing circuit of said first relay and a second normally open maintaining contact in shunt of the normally closed contact of said limit switch, and said normally open contact of said limit switch being connected for energizing said first relay through said interlocking contact of said second relay whereby said second relay deenergizes in response to power failure and interrupts its maintaining circuit to prevent energization of said first relay and thereby to prevent a false count when power is reestablished if a tray is resting on said limit switch.

18. In a conveyor system, an incoming conveyor, a plurality of storage conveyors for storing groups of article trays awaiting delivery, an outgoing conveyor for receiving and delivering article trays from said storage conveyors, a plurality of controllable stopping means one for each storage conveyor for normally maintaining the trays in storage on the respective storage conveyors, and means for controlling said stopping means to release the groups of trays from said storage conveyors in sequence for delivery by said outgoing conveyor and comprising selectively operable means for initiating operation of the stopping means of the first storage conveyor to initiate release of trays therefrom, and means responsive to said selectively operable means for controlling said plurality of stopping means successively to release said groups of trays from said storage conveyors in sequence, said controlling means further comprising memory means for counting the trays and for registering information pertaining to the number of trays in transit that have been released and the storage conveyor origin of the released trays at any given time and for maintaining such registration in the event of power disconnection, and means responsive to said registrations upon reestablishment of power for controlling delivery of said in-transit trays to their destination and for controlling said stopping means to continue release of trays from said storage conveyors in the pre-existing manner.

19. The invention defined in claim 18, wherein said controlling means further comprises a plurality of limit switches one for each storage conveyor mounted beyond said stopping means on the respective storage conveyors for operation by the released trays, first stopping means responsive to one of said limit switches for counting the trays of a train thereof released from a first storage conveyor and for recycling to count the trays of a next train thereof, second stepping means responsive to each cycle of operation of said first stepping means for locking the stopping means of the first storage conveyor to prevent further release of trays and for operating the stopping means of the next storage conveyor to release trays therefrom, third stepping means responsive to each cycle of operation of said first stepping means for counting the empty storage conveyors and for registering such count, and means responsive to registration of one count on said third stepping means for controlling the refilling of the empty storage conveyor with trays from said incoming conveyor.

20. The invention defined in claim 19, wherein each of said limit switches is provided with a normally open and a normally closed contact, said normally open contact being closed and said normally closed contact being opened when each said limit switch is engaged by a tray, a first relay for controlling said first stepping means, a second relay energizable through said normally closed contacts in series and having a first normally open interlocking contact in the energizing circuit of said first relay and a second normally open maintaining contact in shunt of the normally closed contacts of said limit switches, and said normally open contacts of said limit switches being connected in parallel for energizing said first relay through said first contact of said second relay whereby said second relay deenergizes in response to power failure and interrupts its maintaining circuit to prevent energization of said first relay and thereby to prevent a false count when power is reestablished if a tray is resting on one of said limit switches.

References Cited in the file of this patent
UNITED STATES PATENTS

| | | |
|---|---|---|
| 2,558,751 | Hebert | July 3, 1951 |
| 2,652,301 | Skillman | Sept. 15, 1953 |
| 2,728,466 | Postlewaite | Dec. 27, 1955 |
| 2,785,800 | Furman | Mar. 19, 1957 |
| 2,924,324 | Benson | Feb. 9, 1960 |
| 2,969,883 | Cargill | Jan. 31, 1961 |
| 3,011,621 | Byrnes et al. | Dec. 5, 1961 |